United States Patent
Sone et al.

(10) Patent No.: US 6,248,808 B1
(45) Date of Patent: Jun. 19, 2001

(54) PROCESS FOR PREPARING SURFACE-TREATED CARBON BLACK AND RUBBER COMPOSITION

(75) Inventors: Kazuhiro Sone; Masami Ishida; Kiyoshi Mizushima, all of Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/147,127

(22) PCT Filed: Apr. 17, 1997

(86) PCT No.: PCT/JP97/01331
§ 371 Date: Oct. 14, 1998
§ 102(e) Date: Oct. 14, 1998

(87) PCT Pub. No.: WO97/39068
PCT Pub. Date: Oct. 23, 1997

(30) Foreign Application Priority Data

Apr. 17, 1996 (JP) .................................................. 8-095278

(51) Int. Cl.$^7$ ................................................ C08K 9/00
(52) U.S. Cl. ......................................... 523/215; 423/449.2
(58) Field of Search ........................... 523/215; 423/449.2

(56) References Cited

U.S. PATENT DOCUMENTS 5,679,728 * 10/1997 Kawazura et al. .................... 523/215

FOREIGN PATENT DOCUMENTS

| 53-100190 | 9/1978 | (JP) . |
| 63-63755 | 3/1988 | (JP) . |
| 5-295294 | 11/1993 | (JP) . |
| 8-157771 | 6/1996 | (JP) . |
| 8-277347 | 10/1996 | (JP) . |

OTHER PUBLICATIONS

Chemical Abstract, AN 99209, vol. 107, No. 12, Sep. 21, 1987, JP 61 291659, Dec. 22, 1986.

* cited by examiner

*Primary Examiner*—Peter D. Mulcahy
(74) *Attorney, Agent, or Firm*—Oblon, Spivak, McClelland, Maier & Neustadt, P.C.

(57) ABSTRACT

Carbon black having silica attached to the surface, characterized in that the attached silica has a size of from 0.1 to 20 nm in thickness and from 1 to 40 nm in width.

16 Claims, 3 Drawing Sheets

PROCESS FOR PREPARING SURFACE-TREATED CARBON BLACK AND RUBBER COMPOSITION

TECHNICAL FIELD

The present invention relates to a method for producing carbon black having silica attached to the surface to have silanol groups present on the surface, and a rubber composition having such carbon black incorporated. The obtained rubber composition is useful for the production of e.g. tire treads or belts.

BACKGROUND ART

"tan δ" is available as in index of heat generation when a vulcanized rubber composition having reinforcing particles incorporated, is subjected to repeated deformation. For example, it is known that tan δ at from 50 to 70° C. may be made small in order to reduce the rolling resistance of a tire tread and to reduce the fuel cost. On the other hand, the damping properties on a wet road surface, etc., are better, when tan δ in the vicinity of 0° C. is larger. As a method for improving this temperature dependency of tan δ i.e. for reducing tan δ at from 50 to 70° C. and increasing tan δ in the vicinity of 0° C., it has been tried to incorporate silica as a filler. For example, JP-A-3-252433 discloses that silica and a silane coupling agent are incorporated to SBR prepared by solution polymerization. Further, JP-A-7-165991 discloses that as a silane coupling agent, a bifunctional one which is reactive with silica and rubber, is particularly excellent.

In this connection, it is known that when particles having silanol groups on the surface, such as silica particles, are kneaded into a diene type rubber together with a silane coupling agent such as bis(3-triethoxysilylpropyl)-tetrasulfone, followed by vulcanization, the particles and the rubber will be bonded via the coupling agent. It is considered that by such a chemical bonding, tan δ in the vicinity of 60° C. of the particles-incorporated vulcanized rubber composition becomes low, and improvement in the physical properties, such as improvement in the abrasion resistance, is observed.

However, in a case where silica is incorporated as a filler, although it is possible to improve the temperature dependency of tan δ, there is a problem that the silica filler has a self agglomerating force which is so strong that it is hardly dispersible in rubber and it is poor in processability. Further, there is another problem that the compound cost increases, since it is necessary to incorporate an expensive silane coupling agent usually as much as from 5 to 15% relative to the silica.

Further, if a silane coupling agent having a sulfur atom as mentioned above, is incorporated without incorporating a silica filler to carbon black, there will be a case where tan δ in the vicinity of 60° C. of the particles-incorporated rubber composition, will be substantially reduced. However, there will be a drawback that the damping properties tend to be low, since the complex modulus of elasticity (E*) or the dynamic modulus of elasticity (E') is high in a low temperature range (from −10 to 0° C.) under a low strain (from 0.1 to 1%).

On the other hand, it has been proposed to subject carbon black to be incorporated to a rubber composition to surface treatment with silica or a silane. For example, JP-A-53-100190 or JP-A-61-291659 discloses a method of mixing an organic compound or an organometallic compound of silicon dissolved in a solvent or in water, with carbon black, followed by drying. Specifically, as the silicon compound, dimethylpolysiloxane or silicon oil is employed. Further, JP-A-56-38357 proposes hydrophobically surface-treated carbon black having the surface treated with a cyclic alkylpolysiloxane or a silicon compound. JP-A-58-125249 discloses carbon black having the surface coated with a silane coupling agent dissolved in a solvent.

JP-A-63-63755 proposes a method wherein carbon black is dispersed in water, and sodium silicate is neutralized with sulfuric acid, whereby amorphous silica is precipitated on the carbon black surface. However, none of these methods can be said to be suitable for industrial application from the viewpoint of the economy or the process such as removal or recovery of the solvent, or the operation for neutralization. Further, JP-A-4-233976 proposes to chemically modify carbon black with a certain specific organic silicon compound (specifically, a sulfur-containing silane coupling agent having a certain specific structure). However, this method also has a processwise or economical problem, e.g. in the extraction operation or post-treatment for modification. Besides, in these methods for treating carbon black with a surface treating agent such as silica or a silane, it is expected also that the surface treating agent will not sufficiently uniformly attach to the surfaces of all carbon black.

DISCLOSURE OF THE INVENTION

In view of the above problems, the present inventors have conducted an extensive study on a method for attaching silica on the surface of carbon black in order to present reinforcing particles having a visco-elastic property (temperature dependency of tan δ) of a level comparable to silica and having the difficult dispersibility and difficult processability of silica improved to a level comparable to carbon black, and a rubber composition having such reinforcing particles incorporated.

As a result, they have found that by carrying out surface treatment of carbon black by a specific method employing a specific silicon-containing compound, it is possible to have silanol groups present on the surface of carbon black efficiently and effectively, and besides, a rubber composition having such surface-treated carbon black incorporated, exhibits excellent properties. Thus, the present invention has been accomplished.

Namely, the present invention resides in surface-treated carbon black characterized by contacting a silane and/or polysiloxane having all organic groups bonded to silicon via oxygen, to the surface of carbon black at not higher than 200° C., and a rubber composition having such surface-treated carbon black incorporated.

By such a present invention, it is possible to introduce silanol groups to the carbon black surface, whereby reduction of tan δ in the vicinity of 60° C. of a vulcanized rubber composition and improvement of a physical property such as improvement of the abrasion resistance which used to be attempted by incorporating particles having silanol groups such as silica particles, can be accomplished without incorporating particles such as silica.

Besides, it is also possible to overcome the drawback that the damping properties tend to be low, since the complex modulus of elasticity (E*) or the dynamic modulus of elasticity (E') is high in a low temperature range (from −10 to 0° C.) under a low strain (from 0.1 to 1%) as in the case where a silane coupling agent having a sulfur atom is incorporated.

Besides, with the surface-treated carbon black obtainable by the present invention, it is possible to improve the difficult dispensability and difficult processability as drawbacks of silica to a level comparable to carbon black. Thus, by the present invention, it becomes possible to present reinforcing particles having merits of silica and carbon black simultaneously i.e. reinforcing particles having a viscoelastic property (temperature dependency of tan δ) of a level comparable to silica and having the difficult dispersibility and difficult processability of silica improved to a level comparable to carbon black, and a rubber composition having such reinforcing particles incorporated.

Figure 1:
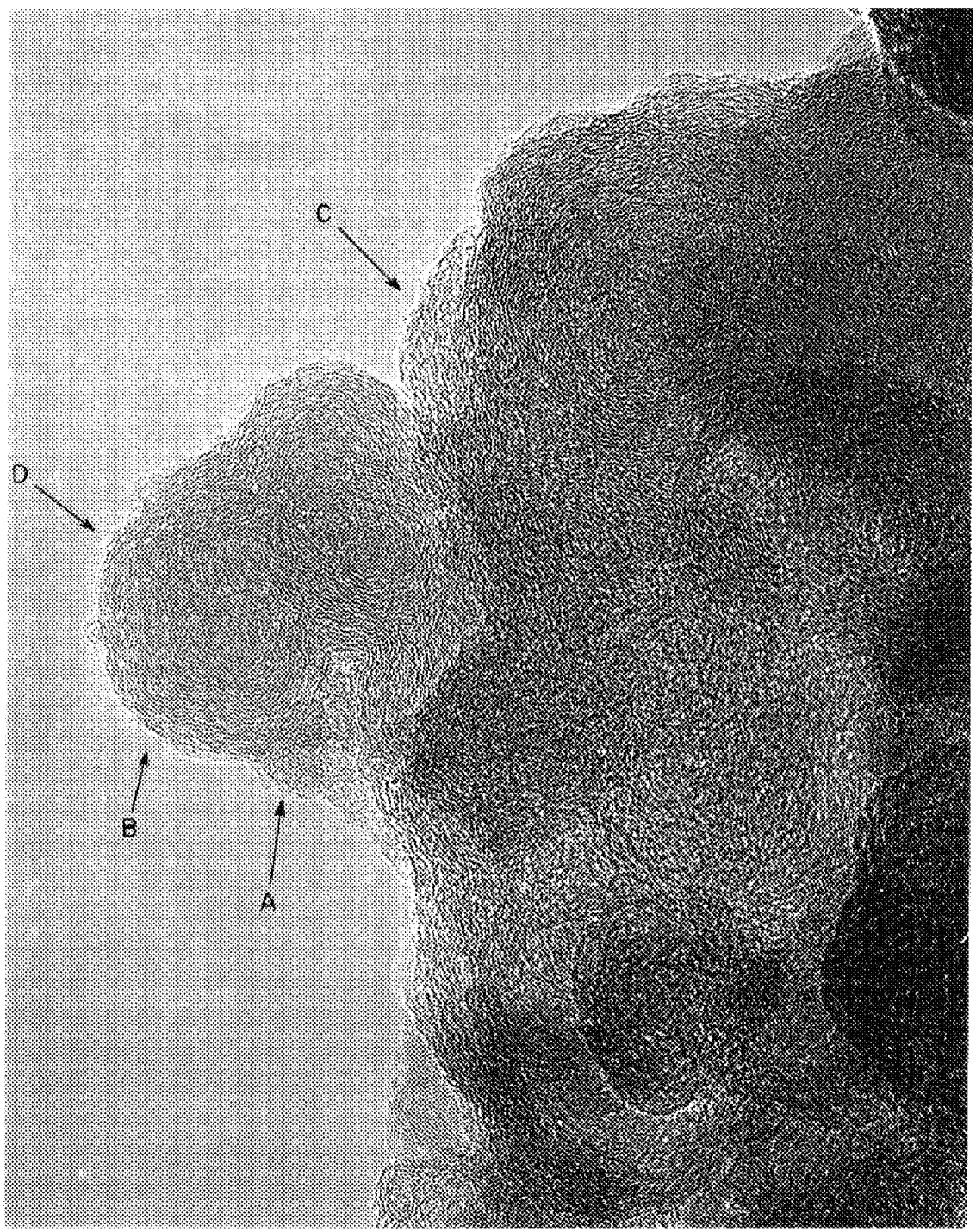
FIG. 1 is a view showing a transmission electron microscopic photograph (2,000,000 magnifications) showing the carbon black having silica attached, obtained in Example 8.

Now, the present invention will be described in detail.

Firstly, carbon black as a starting material to be subjected to surface treatment in the present invention, is not particularly limited, but, when it is to be incorporated to rubber, it may suitably be of various types known as ones capable of being used in the rubber industry, such as furnace black (classification by ASTM D1765), channel black, thermal black and acetylene black. To produce such starting material carbon black, for example, furnace black may be obtained by thermal decomposition or incomplete combustion of a highly aromatic heavy oil by introducing such a heavy oil into a high temperature gas stream.

In the present invention, carbon black is contacted to a specific silicon compound. Namely, it is contacted to a silane and/or polysiloxane having all organic groups bonded to silicon via oxygen.

Here, the silane and/or polysiloxane having all organic groups bonded to silicon via oxygen means a silane having hydrogen, an alkyl group, a vinyl group, a phenyl group or other functional group bonded to Si via O, and/or a polysiloxane having $(Si-O)_n$ as the main chain (the main chain may be branched or may form a ring) and having hydrogen, an alkyl group, a vinyl group, a phenyl group or other functional group bonded to Si via O.

Preferably, a tetraalkoxysilane and/or polyalkoxypolysiloxane, having $C_{1-4}$ alkoxy groups bonded to Si, is employed. The latter can readily be obtained as a lower condensate of the former. As the latter, for example, one represented by the following general formula (A) may be mentioned:

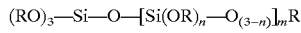

$$(RO)_3-Si-O-[Si(OR)_n-O_{(3-n)}]_mR$$

wherein n=1 or 2, m is an integer of at least 0, and the plurality of R are $C_{1-4}$ alkyl groups which may be different from one another. The alkyl groups may be substituted by hydrogen.

Especially as one having $R=CH_3-$, an oligomer is available which is a lower condensate of tetramethoxysilane, and "MKC silicate MS51" manufactured by Mitsubishi Chemical Corporation is preferred, since the amount of the contained monomer (i.e. tetramethoxysilane) is as small as at most 1 wt %, and thus it is excellent in the stability of quality and yet is safe for use with little toxicity due to the monomer. In the present invention, such a silane and/or polysiloxane having all organic groups bonded to silicon via oxygen may be used as it is, but it may be hydrolyzed by adding water and a hydrolyzing catalyst or the like, or the hydrolyzed product may further be condensed to obtain a hydrolyzed condensate for use.

As such a hydrolyzed condensate, "MKC silicate MS51SG1" (manufactured by Mitsubishi Chemical Corporation) prepared by hydrolyzing and condensing the above-mentioned tetramethoxysilane oligomer in an alcohol, may, for example, be mentioned. This is preferably employed, as many silanol groups are formed by the hydrolysis.

It is considered that such a tetraalkoxysilane and/or polyalkoxypolysiloxane is excellent in attachment to carbon black and in formation of silanol groups as it has many alkoxy groups, and thus substantially improves the properties of the obtainable surface-treated carbon black and the rubber composition having such carbon black incorporated.

Further, one having other organic component such as a silane coupling agent incorporated to such a silane and/or polysiloxane having all organic groups bonded to silicon via oxygen, may be contacted to carbon black. In such a case, said other organic component is desired to be at most 50 parts by weight, preferably at most 20 parts by weight, per 100 parts by weight of the silane and/or polysiloxane having all organic groups bonded to silicon via oxygen. As the organic component, in addition to various silane coupling agents, various resin components may, for example, be mentioned, and it may suitably be selected and incorporated to the above silane and/or polysiloxane, as the case requires.

The surface treatment of carbon black with the silane and/or polysiloxane having all organic groups bonded to silicon via oxygen, is carried out by contacting such a compound to the carbon black at not higher than 200° C. If the temperature exceeds 200° C., evaporation (gasification) of the silane and/or polysiloxane having all organic groups bonded to silicon via oxygen, will be accelerated, thus leading to a problem such that the attaching yield at the time of spraying tends to be low.

The amount of the silane and/or polysiloxane having all organic groups bonded to silicon via oxygen, is not particularly limited, but it is used usually in an amount of from 0.1 to 50 parts by weight, per 100 parts by weight of the carbon black. Further preferably, the amount is from 0.2 to 30 parts by weight. If the amount is too small, the effect for improving the temperature dependency of tan δ tends to be small. On the other hand, if it is too large, the dispersion processability during the kneading tends to be poor, and the cost tends to be high. This contacting of the silane and/or polysiloxane having all organic groups bonded to silicon via oxygen, to the carbon black, is not particularly limited so long as it is in such a manner that these materials can be contacted at not higher than 200° C., as mentioned above. For example, the contacting can readily be carried out by adding one of them to the other. It is particularly preferred to contact them in the granulation step of the carbon black. Namely, a silica source can be attached to the carbon black surface uniformly and simply by granulation after or while adding the silane and/or polysiloxane having all organic groups bonded to silicon via oxygen, to non-granulated carbon black. The granulation step is preferably wet granulation. From the viewpoint of the process, preferred is a method of adding the silane and/or polysiloxane having all organic groups bonded to silicon via oxygen, to granulation water in an amount of a level equal to the non-granulated carbon black. More preferably, a method is employed which comprises adding the silane and/or polysiloxane by emulsifying and dispersing it in the granulation water with a nonionic surfactant or the like. By carrying out the contact in such "presence of water", hydrolysis of the organic groups bonded to silicon via oxygen, is accelerated in the subsequent drying step, to form many silanol groups.

The granulation will be followed by a drying step, but it is preferred that the remaining water content in the drying step is up to 5 wt %. The drying step can be carried out by using an apparatus such as a dryer. It is considered that at that time, part of the organic groups bonded to silicon via oxygen will be hydrolyzed to form silanol groups.

The surface-treated carbon black obtained by the method of the present invention is not particularly limited, but it is preferred that the nitrogen specific surface area is from 20 to 300 $m^2/g$, and DBP absorption is from 50 to 250 cc/100 g. By the method of the present invention, the silica-attached carbon black can be produced conveniently without necessity of a cumbersome operation as in e.g. treatment with sodium silicate. Further, as described hereinafter, according to the method of the present invention, substantially the entire amount of the silica component can be uniformly present on the surface of the carbon black, yet in fine regions, whereby it is possible to obtain silica-attached carbon black which provides a substantial effect in a small amount. Further, control of the quality is easy. Further, by the present invention, substantially the entire amount, i.e. at least 80 wt %, or at least 90 wt %, of the charged amount of the silica component, can be attached to the carbon black, whereby the yield is very good.

The carbon black of the present invention can be obtained by the method of the present invention as described in the foregoing. Namely, it is carbon black having silica attached to the surface and characterized in that at least 80 wt % of the attached silica has a size of from 0.1 to 20 nm in thickness and from 1 to 40 nm in width. The attached silica may be made to have a thickness of from 0.1 to 15 nm and a width of from 1 to 30 nm, or even a width of from 1 to 20 nm. Further, at least 90 wt % of the attached silica may be brought within the above ranges. Namely, the carbon black of the present invention may have the silica component attached in a fine and uniform state, whereby a high performance can be provided. Here, the thickness of the silica is one in a direction perpendicular to the surface of the carbon black, and the width is one in a direction perpendicular to the thickness direction.

The size of the silica component can be confirmed by a transmission electron microscopic photograph. Specifically, with respect to a portion confirmed to be a silica component by such a means as EDX, the shape may be confirmed by the transmission electron microscopic photograph, or the thickness and the width may be measured by the image treatment, as the case requires.

Further, substantially the entire amount of the silica component can be present on the surface of the carbon black. Further, the carbon black of the present invention is treated with a certain specific silicon compound. Namely, it is a silane and/or siloxane having all organic groups bonded to silicon via oxygen. Surface-treatment is carried out by using such a compound, and a large amount of OH groups can easily be formed on the surface of the surface-treated carbon black, whereby the product can be made excellent in compatibility with a vehicle, when incorporated to e.g. rubber.

The amount to be incorporated to rubber is usually from 10 to 200 parts by weight, preferably from 20 to 150 parts by weight, per 100 parts by weight of the rubber component.

The rubber component to be used for the rubber composition of the present invention, is not particularly limited, but it is preferably a crosslinkable rubber. More preferably, it is a diene type rubber vulcanizable with sulfur. The rubber may be of single substance or a blend of two or more different types.

To the rubber composition of the present invention, in addition to the surface-treated carbon black obtained by the method of the present invention, usual carbon black or silica may be incorporated. However, the amount of such incorporation is preferably not more than five times of the above surface-treated carbon black.

Further, it is preferred to incorporate a silane coupling agent to the rubber composition of the present invention. As the silane coupling agent, one heretofore commonly used may optionally be incorporated. But, an at least two functional one capable of reacting with the silanol group and the rubber type polymer, is preferred. Specifically, bis(3-triethoxysilylpropyl)-tetrasulfide or mercaptopropyltriethoxysilane may, for example, be mentioned. This is because a silanol group formed on the surface of the carbon black by the present invention, will react and be bonded to the alkoxy moiety of the silane coupling agent during kneading, and the sulfide moiety will react with the rubber type polymer in the vulcanization reaction. In such a case, by using the surface-treated carbon black obtained by the present invention, the amount of the silane coupling agent may be small as compared with usual incorporation to silica. Namely, usual incorporation to silica has a problem that the compound cost tends to be high, since an expensive silane coupling agent is required to be added usually in an amount of from 5 to 15 parts by weight per 100 parts by weight of the silica. Whereas, according to the present invention, the amount of the silane coupling agent is sufficient with from 1 to 10 parts by weight relative to the surface-treated carbon black obtained by the present invention, although it depends also on the amount of the silica attached. This means that the total amount of silanol groups present on the surface of the carbon black is smaller than silanol groups on the surface of usual silica particles, and the silane coupling agent may be the amount sufficient to react therewith. Thus, according to the present invention, there is also a merit that the compound cost will be low as compared with the silica type blend.

The rubber composition having the surface-treated carbon black obtained by the present invention incorporated, is presented suitably for applications to tires, such as tire treads, under treads or side treads, or as common rubber part materials such as rubber vibration insulators or belts.

EXAMPLES

Now, the present invention will be described with reference to Examples.

EXAMPLES 1 to 7

Preparation of Surface-treated Carbon Black

As carbon black, 1000 g of a non-granulated product of "N220" ("DIABLACK-I", manufactured by Mitsubishi Chemical Corporation) was put into a laboratory granulating apparatus. As a silane and/or polysiloxane having all organic groups bonded to silicon via oxygen, the predetermined amount (as disclosed in Table 1) of an oligomer which was a lower condensate of tetramethoxysilane (tradename: "MKC Silicate MS51" Mitsubishi Chemical Corporation), was emulsified with a nonionic surfactant (tradename: "Emulgen 920" Kao Corporation) and added to the above carbon black together with water. The laboratory granulating apparatus was closed with a cover, followed by high speed stirring at 60° C. for 1 minute. The granulated product thus obtained, was dried by a dryer to obtain surface-treated carbon black of Examples 1 to 6.

Then, using a hydrolyzed condensate (tradename: "MKC Silicate MS51SG1" Mitsubishi Chemical Corporation)

obtained by hydrolyzing "MKC Silicate MS51" in ethanol by adding water in an amount of 0.57 mol time relative to the alkoxy groups of MS51, as a silane and/or polysiloxane having all organic groups bonded to silicon via oxygen, an operation similar to the above was carried out, to obtain surface-treated carbon black of Example 7.

COMPARATIVE EXAMPLES 1 to 3

On the other hand, an operation similar to Examples was carried out except that the silane and/or polysiloxane having all organic groups bonded to silicon via oxygen and the nonionic surfactant were not added, to obtain usual carbon black having no silica attached, of Comparative Example 1.

Further, Comparative Example 2 is silica itself (tradename: Nipsil AQ" Nippon Silica Kogyo K.K.), and Comparative Example 3 is a mechanical mixture (blend product) of carbon black and silica (Nipsil AQ).

Measurement of the Silica Content and the Colloidal Properties of Surface-treated Carbon Black Surface-treated carbon black was ashed at 750° C. and the ash content was obtained, in accordance with the ash content measuring method of JIS K6221. The amount obtained by subtracting from this ash content the ash content of the carbon black of Comparative Example 8 having no silica attached, was taken as the silica content. The results are shown in Table 1 together with other colloidal property values. Further, measuring methods for colloidal property values are as follows.

Nitrogen specific surface area: ASTM D3037

CTAB specific surface area: ASTM D3765

Iodine adsorption: JIS K6221 "method for testing carbon black for rubber"

DBP oil absorption: JIS K6221 "method for testing carbon black for rubber"

Preparation of a Surface-treated Carbon Black-containing Rubber Composition, and Measurement of the Rubber Physical Properties Various components as identified in Table 2 were mixed and kneaded by a Banbury mixer and an open roll mixer in accordance with a conventional method to prepare a rubber composition. (In Table 2, "SBR1502" represents styrene-butadiene rubber "1502" (styrene content: 23.5 wt %), manufactured by Japan Synthetic Rubber Co., Ltd.) Such a rubber composition was subjected to press vulcanization at 160° C. to prepare a vulcanized rubber test specimen. Various tests were carried out by the following test methods, and the physical properties were measured.

(1) $E^*$, tan $\delta$: $E^*$ and tan $\delta$ which are dynamic visco-elasticity properties, were measured under the following conditions using "DVE rheo spectra" manufactured by Kabushiki Kaisha Rheology.

$E^*$: static strain 10%, dynamic strain (amplitude) 0.3%, frequency 20 Hz, measuring temperature −10° C.

tan $\delta$: static strain 10%, dynamic strain (amplitude) 4%, frequency 20 Hz, measuring temperature: two levels of 0° C. and 60° C.

(2) Abrasion resistance: measured under the following conditions using a Rambong abrasion tester.

Test specimen: thickness 10 mm, outer diameter 44 mm, test load 4 kg, slip ratio between the grinding stone and the test specimen 45%, measuring temperature 25° C.

(3) Dispersibility (D%) of reinforcing particles in rubber: in accordance with the method for measuring dispersion of carbon black according to ASTM D2663-B method (method of counting agglomerates). Namely, the vulcanized rubber was sliced into a thin film by a sledge type microtome (manufactured by Leitz), whereupon the total cross-sectional area occupied by agglomerates of reinforcing particles (carbon black or silica) of at least 5 μm in the blend, was measured by an optical microscope, and the percentage of reinforcing particles dispersed with at most 5 μm was obtained from the total cross-sectional area (calculated value) of the reinforcing particles added to the blend, and was taken as the dispersibility (D%).

The results obtained in (1) to (3) are shown in Table 3.

TABLE 1

Preparation of silica-attached carbon black and property values

| Examples | Working Examples | | | | | | | | Comparative Examples | |
|---|---|---|---|---|---|---|---|---|---|---|
| Run No. | 1 | 2 | 3 | 4 | 5 | 6 | 7 | 1 | 2 | 3 |
| Type of reinforcing particles | Si-attached CB | Si-attached CB | Si-attached CB | Si-attached CB | Si-attached CB | Si-attached CB | Si-attached CB | CB | Silica | CB/Silica blend |
| N220 charged amount (g) *1) | 1000 | 1000 | 1000 | 1000 | 1000 | 1000 | 1000 | 1000 | — | — |
| MS51 charged amount (g) *2) | 4.8 | 9.6 | 19.2 | 38.4 | 96 | 192 | — | 0 | — | — |
| MS51SG1 charged amount (g) *3) | — | — | — | — | — | — | 125 | 0 | — | — |
| MS51 amount (relative to parts by weight of CB) | 0.48 | 0.96 | 1.92 | 3.84 | 9.6 | 19.2 | — | 0 | — | — |
| MS51SG1 amount (relative to parts by weight of CB) | — | — | — | — | — | — | 12.5 | 0 | — | — |
| SiO$_2$ content (%): theoretical amount *4) | 0.25 | 0.5 | 1 | 2 | 5 | 10 | 2 | 0 | 100 | 5 |
| CB/silica *5) blend ratio | — | — | — | — | — | — | — | 100/0 | 0/100 | 95/5 |
| Ash content (%) | 0.29 | 0.55 | 1.1 | 2.03 | 4.72 | 8.74 | 2.05 | 0.08 | 95.9 | 4.87 |

TABLE 1-continued

Preparation of silica-attached carbon black and property values

| Examples | Working Examples | | | | | | | Comparative Examples | | |
|---|---|---|---|---|---|---|---|---|---|---|
| Run No. | 1 | 2 | 3 | 4 | 5 | 6 | 7 | 1 | 2 | 3 |
| Type of reinforcing particles | Si-attached CB | Si-attached CB | Si-attached CB | Si-attached CB | Si-attached CB | Si-attached CB | Si-attached CB | CB | Silica | CB/Silica blend |
| Apparent $SiO_2$ amount*6) (%) | 0.21 | 0.47 | 1.02 | 1.95 | 4.64 | 8.66 | 1.97 | 0 | 95.9 | 4.79 |
| Nitrogen specific surface area ($m^2/g$) | 113 | 109 | 105 | 102 | 94 | 87 | 103 | 115 | 192 | 119 |
| CTAB specific surface area ($m^2/g$) | 113 | 113 | 112 | 111 | 115 | 74 | 113 | 111 | 198 | 115 |
| Iodine adsorption (mg/g) | 108 | 107 | 104 | 101 | 92 | 85 | 98 | 110 | 0.1 | 105 |
| DBP oil absorption (ml/100 g) | 106 | 105 | 102 | 102 | 103 | 102 | 102 | 106 | 169 | 109 |

*1) DIABLACK-1, non-granulated product (manufactured by Mitsubishi Chemical Corporation)
*2) MKC Silicate MS51 (manufactured by Mitsubishi Chemical Corporation)
*3) NKC Silicate MS51SG1 (manufactured by Mitsubishi Chemical Corporation)
*4) Theoretical $SiO_2$ amount in MS51 or MS51SG1 as calculated as wt % per CB.
*5) Value calculated from Nipsil AQ (manufactured by Nippon Silica Kogyo K.K.)
*6) Ash content-ash content in Comparative Example 1.

TABLE 2

Preparation of silica-attached carbon black-containing rubber composition (blend)

| Examples | Working Examples | | | | | | | | Comparative Examples | | | |
|---|---|---|---|---|---|---|---|---|---|---|---|---|
| Run No. | 1 | 2 | 3-1 | 3-2 | 4 | 5 | 6 | 7 | 1-1 | 1-2 | 2 | 3 |
| (Blend: parts by weight) | | | | | | | | | | | | |
| SBR1502 | 100 | 100 | 100 | 100 | 100 | 100 | 100 | 100 | 100 | 100 | 100 | 100 |
| CB *2) | — | — | — | — | — | — | — | — | — | — | — | 47.5 |
| Silica *1) | — | — | — | — | — | — | — | — | — | — | 50 | 2.5 |
| Si-attached CB | 50 | 50 | 50 | 50 | 50 | 50 | 50 | 50 | 50 | 50 | — | — |
| Si69 *3) | 5 | 5 | 5 | 2 | 5 | 5 | 5 | 5 | 0 | 5 | 5 | 5 |
| Zinc white | 5 | 5 | 5 | 5 | 5 | 5 | 5 | 5 | 5 | 5 | 5 | 5 |
| Stearic acid | 2 | 2 | 2 | 2 | 2 | 2 | 2 | 2 | 2 | 2 | 2 | 2 |
| Age resister *4) | 2 | 2 | 2 | 2 | 2 | 2 | 2 | 2 | 2 | 2 | 2 | 2 |
| Sulfur | 1.5 | 1.5 | 1.5 | 1.5 | 1.5 | 1.5 | 1.5 | 1.5 | 1.5 | 1.5 | 1.5 | 1.5 |
| Vulcanization accelerator *5) | 1.2 | 1.2 | 1.2 | 1.2 | 1.2 | 1.2 | 1.2 | 1.2 | 1.2 | 1.2 | 1.2 | 1.2 |
| Vulcanization accelerator *6) | 1 | 1 | 1 | 1 | 1 | 1 | 1 | 1 | 1 | 1 | 1 | 1 |

*1) Nipsil AQ (manufactured by Nippon Silica Kogyo K.K.)
*2) DIABLACK-1 (manufactured by Mitsubishi Chemical Corporation)
*3) silane coupling agent: Si69 (manufactured by Degussa AG.)
*4) N-(1,3-dimethylbutyl)-N'-phenyl-p-phenylenediamine: Santoflex 13 (manufactured by Nonsanto Co.)
*5) N-tert-butyl-2-benzothiazyl sulfenamide: SantocureNS (manufactured by Monsanto Co.)
*6) N,N'-diphenyl guanidine: Nokseller-D (manufactured by Ouchishinko Corp.)

TABLE 3

Rubber physical properties

| Examples | Working Examples | | | | | | | | Comparative Examples | | | |
|---|---|---|---|---|---|---|---|---|---|---|---|---|
| Run No. | 1 | 2 | 3-1 | 3-2 | 4 | 5 | 6 | 7 | 1-1 | 1-2 | 2 | 3 |
| E*(−10° C.) 0.3% *4) | 32.1 | 32.2 | 31.5 | 31.1 | 30.9 | 32.4 | 29.8 | 30.5 | 33.5 | 35.3 | 31.3 | 35.0 |
| tan δ (0° C.) 4.0% *5) | 0.309 | 0.300 | 0.300 | 0.310 | 0.301 | 0.303 | 0.292 | 0.303 | 0.311 | 0.289 | 0.309 | 0.290 |

TABLE 3-continued

Rubber physical properties

| Examples | Working Examples | | | | | | | | Comparative Examples | | | |
|---|---|---|---|---|---|---|---|---|---|---|---|---|
| Run No. | 1 | 2 | 3-1 | 3-2 | 4 | 5 | 6 | 7 | 1-1 | 1-2 | 2 | 3 |
| tan δ (0° C.) 4.0% *6) | 0.150 | 0.150 | 0.146 | 0.156 | 0.150 | 0.149 | 0.145 | 0.148 | 0.200 | 0.166 | 0.153 | 0.161 |
| Abrasion resistance index (INDEX) | 99 | 101 | 100 | 102 | 99 | 100 | 97 | 100 | 100 | 96 | 78 | 96 |
| Dispersibility of reinforcing particles (%) | 99.1 | 98.2 | 98.7 | 98.3 | 98.5 | 98.7 | 95.4 | 99.0 | 98.3 | 98.7 | 91.7 | 97.9 |

*4) Temperature: −10° C., static strain: 10%, dynamic strain (amplitude): 0.3% frequency: 20 Hz, E* unit MPa
*5) Temperature: 0° C., static strain: 10%, dynamic strain (amplitude): 4.0% frequency: 20 Hz
*6) Temperature: 60° C., static strain: 10%, dynamic strain (amplitude): frequency: 20 Hz
*7) Rambong abrasion test, thickness of sample: 10 mm, load: 4 kg, slip ratio: 45% Comparative Example 1-1 taken as being 100
The larger the value of INDEX, the better (the smaller the abrasion)

From Table 1, it is evident that by surface-treating carbon black with a silane and/or polysiloxane having all organic groups bonded to silicon via oxygen according to the present invention, substantially a theoretical amount of $SiO_2$ can be attached to carbon black. Namely, the theoretical value of $SiO_2$ content derived from "MKC Silicate MS51" or "MKC Silicate MS51SG", substantially agrees to the "apparent $SiO_2$ amount" obtained by subtracting an ash content of carbon black (Comparative Example 1) having no surface treatment applied, from the ash content of the surface-treated carbon black, and this indicates that it is attached in good yield.

As is evident from Tables 2 and 3, with rubber compositions having carbon blacks surface-treated by the present invention (Examples 1 to 7) incorporated, tan δ at a high temperature region (60° C.) only is reduced while maintaining tan δ at a low temperature region (0° C.) at a high level, as compared with a rubber composition having usual carbon black having no surface treatment applied incorporated (Comparative Example 1-1). Namely, when such a rubber composition is employed for a tire tread or the like, a tire is obtainable whereby only the rolling resistance is reduced without sacrificing the damping properties on a wet road surface. Further, also the abrasion resistance will not be deteriorated.

Further, usually, a silane coupling agent is not added to a carbon black system. However, in Comparative Example 1-2 wherein Si69 was added in an amount of 5 parts by weight, the balance of tan δ in the low temperature region and the high temperature region is close to a silica system and improved. However, the complex modulus of elasticity E* at a low temperature under a low strain, is high, and particularly, the damping properties on e.g. the road surface with a low frictional coefficient, are poor. Whereas, in Working Examples, this E* is low and improved.

Now, as compared with Comparative Example 2 wherein usual silica was incorporated, Working Examples are equal (Comparable to silica) with respect to the balance of tan δ in the low temperature region and the high temperature region, and excellent in the abrasion resistance and the dispersibility of reinforcing particles (comparable to usual carbon black). Namely, it is evident that Working Examples have viscoelasticity properties comparable to silica (the balance of tan δ in the low temperature region and the high temperature region, and the E* property at a low temperature under a low strain) and abrasion resistance and particle dispersibility comparable to carbon black.

Comparative Example 3 is one having carbon black and silica blended. As is apparent from the comparison with Example 5 wherein the total silica content in the particles is substantially the same, the effects of the present invention can not be obtained by a mere blend of carbon black and silica, and they are obtained only by using the carbon black surface-treated by the method of the present invention.

EXAMPLES 8 and 9

Silica-attached carbon blacks were obtained in the same manner as in Example 1 except that as carbon black, "N339" (iodine adsorption: 92 $m^2/g$, nitrogen adsorption specific surface area: 105 $m^2/g$) manufactured by Mitsubishi Chemical Corporation, was used, and "MS51" was used so that the silica amount became 1 wt % and 5 wt % (calculated as the charged amount), respectively. The electrical conductivities (volume resistivities) of the obtained carbon blacks are shown in Table 4. Further, using these silica-attached carbon blacks, various components as identified in Table 5 were mixed and kneaded by a Banbury mixer and an open roll mixer to prepare rubber compositions. The physical properties (tan δ) of the obtained rubber compositions are shown in Table 4.

Figure 2:
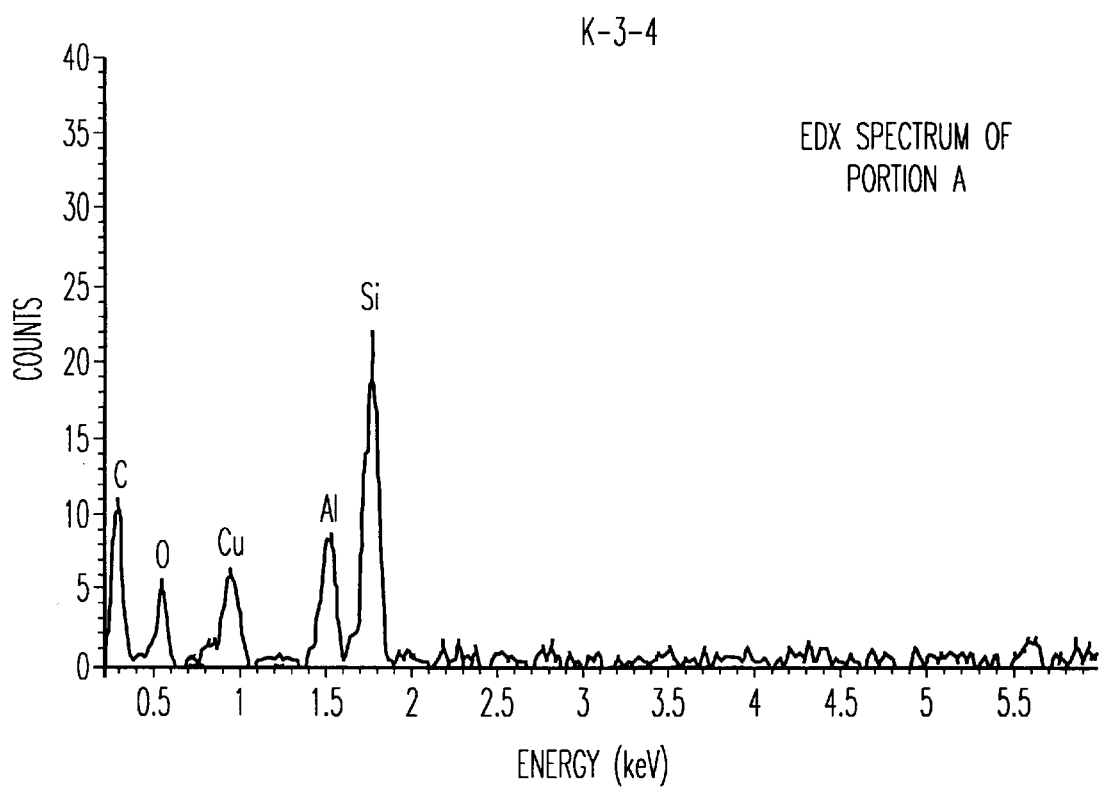
FIG. 2 is a view showing the EDX spectrum of Portion A in FIG. 1.
Figure 3:
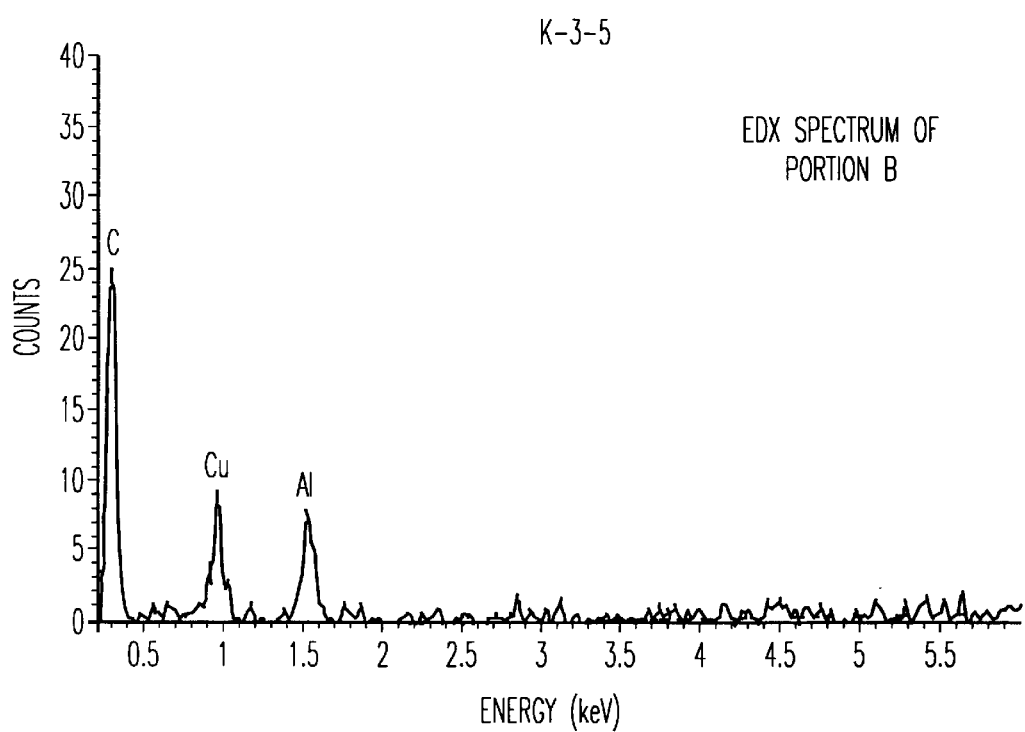
FIG. 3 is a view showing the EDX spectrum of Portion B in FIG. 1.

A transmission electron microscopic photograph (2,000,000 magnifications) of the silica-attached carbon black obtained in Example 8, is shown in FIG. 1, and EDX spectra of portion A and portion B in FIG. 1 are shown in FIGS. 2 and 3, respectively. It is thereby evident that portion A is a silica component, and the thickness of the silica component is about 10 nm, and the width is about 20 nm. Further, the same was true with respect to other regions of the carbon black.

COMPARATIVE EXAMPLES 4 and 5

Carbon black was charged into the apparatus used in Example 1, and a liquid obtained by diluting sodium silicate (reagent grade) with water to a concentration of 1 wt %, was added so that the silica component became 1 wt % and 5 wt % (calculated as charged amount), respectively. Further, 5% sulfuric acid was added to adjust the pH to 9, and the laboratory granulation apparatus was closed with a cover, followed by high speed stirring at 60° C. for 1 minute. The granulated product thus obtained was dried by a dryer to obtain silica-attached carbon blacks.

In the same manner as in Example 8, the electrical conductivities (volume resistivities) are shown in Table 4. In the same manner as in Example 8, the rubber compositions were prepared, and the physical properties (tan δ) of the obtained rubber compositions are shown in Table 4.

TABLE 4

|  |  | Example 8 | Example 9 | Comparative Example 4 | Comparative Example 5 |
|---|---|---|---|---|---|
| Silica amount (as charged) |  | 1% | 5% | 1% | 5% |
| Rubber property | tan δ (0° C.) | 0.467 | 0.487 | 0.450 | 0.436 |
|  | tan δ (60° C.) | 0.236 | 0.210 | 0.223 | 0.226 |
| Electrical conductivity (Ω · cm) |  | 8.71E + 03 | 9.65E + 03 | 8.94E + 04 | 1.05E + 05 |

(Further, the electrical conductivity (Ω · cm) of "N339" is 8.76E + 0.3, and the electrical conductivity (Ω· cm) of the silica is 5.75E + 13.)

TABLE 5

Preparation of rubber compositions (blend proportions of various components: part by weight)

| Components | Proportions |
|---|---|
| SBR1502 | 50 |
| NR (natural rubber) | 50 |
| Carbon black | 50 |
| Aroma oil | 10 |
| Si69 *3) | 5 |
| Zinc white | 5 |
| Stearic acid | 2 |
| Age resister *4) | 2 |
| Sulfur | 1.5 |
| Vulcanization accelerator *5) | 1.2 |
| Vulcanization accelerator *6) | 1 |

In Table 5, *3), *4), *5) and *6) are the same as in Table 2. Further, aroma oil used, was one manufactured by Fuji Kosan K.K.

As is apparent from Table 4, Examples 8 and 9 treated with a siloxane compound were superior in both the rubber property and the electrical conductivity to Comparative Examples 4 and 5 treated with water glass (sodium silicate).

INDUSTRIAL APPLICABILITY

As described in the foregoing, according to the present invention, silanol groups can be introduced to the carbon black surface, whereby reduction of tan δ in the vicinity of 60° C. of the vulcanized rubber composition and improvement of the physical property such as improvement of the abrasion resistance, which used to be attempted by blending particles having silanol groups, such as silica particles, can be accomplished without incorporating particles such as silica.

Further, it is thereby possible to overcome the drawback such that the damping properties tend to decrease as the complex modulus of elasticity (E*) or the dynamic modulus of elasticity (E') is high in a low temperature range (from −10 to 0° C.) under a low strain (from 0.1 to 1%) as in the case where a silane coupling agent having a sulfur atom is incorporated.

Further, with the surface-treated carbon black of the present invention, it becomes possible to improve the difficult dispersibility and difficult processability which are drawbacks of silica, to a level comparable to carbon black. Accordingly, by the present invention, it becomes possible to provide reinforcing particles having merits of silica and carbon black simultaneously, i.e. reinforcing particles having a visco-elastic property (temperature dependency of tan δ) of a level comparable to silica and having the difficult dispensability and difficult processability of silica improved to a level comparable to carbon black, and a rubber composition having such reinforcing particles incorporated.

What is claimed is:

1. A method for producing surface-treated carbon black, which comprises contacting a silane or polysiloxane or a combination thereof having all organic groups bonded to silicon via oxygen, to carbon black, at not higher than 200° C.

2. The method for producing surface-treated carbon black according to claim 1, wherein the bonding of the silane or polysiloxane or both having all organic groups bonded to silicon via oxygen, to carbon black, is carried out by carrying out granulation while adding the silane or polysiloxane having all organic groups bonded to silicon via oxygen, to non-granulated carbon black, or granulating the carbon black after adding the same.

3. The method for producing surface-treated carbon black according to claim 2, wherein the granulation step of the carbon black is wet granulation, and the granulation is followed by a step of drying by a dryer until the water content becomes not higher than 5 wt %.

4. The method for producing surface-treated carbon black according to claim 1, wherein the groups bonded to silicon, of the silane or polysiloxane or both having all organic groups bonded to silicon via oxygen, or alkoxy groups.

5. The method for producing surface-treated carbon black according to claim 4, wherein the alkoxy groups are methoxy groups.

6. The method for producing carbon black according to claim 1, wherein the silane or polysiloxane or both having all organic groups bonded to silicon via oxygen, is a condensate of a tetraalkoxysilane.

7. This method for producing surface-treated carbon black according to claim 6, wherein the tetraalkoxysilane is tetramethoxysilane.

8. The method for producing surface-treated carbon black according to claim 1, wherein the amount of the silane or polysiloxane or both having all organic groups bonded to silicon via oxygen, is from 0.1 to 50 parts by weight per 100 parts by weight of the carbon black.

9. A rubber composition having carbon black obtained by the method as defined in claim 1, incorporated into a rubber component.

10. The rubber composition having the carbon black as defined in claim 9, incorporated to a rubber component.

11. The rubber composition of claim 9, wherein said carbon black is present in an amount of from 10 to 200 parts by weight per 100 parts by weight of the rubber component.

12. The rubber composition of claim 10, wherein said carbon black is present in an amount of from 20 to 150 parts by weight per 100 parts by weight of the rubber component.

13. The rubber composition of claim 9, wherein said rubber of said composition is a crosslinkable rubber.

14. The rubber composition of claim 12, wherein said rubber is a diene rubber vulcanizable with sulfur.

15. Surface-treated carbon black having silica attached to the surface, prepared according to the method of claim 1.

16. The surface-treated carbon black of claim 15, wherein the attached silica is from 0.1 to 20 nm in thickness and from 1 to 40 nm in width.

* * * * *